United States Patent Office 3,003,856
Patented Oct. 10, 1961

3,003,856
METHOD FOR TRACING THE FLOW OF $H_2O$
John L. Boyd, Tulsa, Okla., assignor to Sinclair Oil & Gas Company, Tulsa, Okla., a corporation of Maine
No Drawing. Filed June 30, 1958, Ser. No. 745,284
7 Claims. (Cl. 23—230)

This invention relates to a method for analyzing the flow of water and is particularly concerned with a method employing thiocyanate ions for tracing the flow of water in subterranean areas. Methods for tracing flow of water in subterranean areas are highly desirable in the oil well treating field and especially in tracing water flooding operations, e.g. driving water through an oil-bearing formation as from an input to an output well for the purpose of enhancing oil recovery from the output well.

In accordance with the method of the present invention for tracing the flow of water in subterranean areas, thiocyanate ions are provided in water at an origin point, portions of water are obtained at a recovery point and the portions are analyzed for thiocyanate ion content as an indication of water derivation or flow from the origin point. Thiocyanate ions can be provided through the addition of water-soluble, thiocyanate ion-yielding compounds to the water at the origin point. These compounds, which have been found to be only insignificantly, if at all, absorbed by the formation, can be inorganic as well as oil-insoluble, and include ammonium thiocyanate as well as a thiocyanate of an alkali metal, e.g. with an atomic weight of 22 to 40, i.e. sodium and potassium. Ammonium thiocyanate is highly preferred since it is not poisonous, readily detected by methods useable by unskilled labor and soluble in water and insoluble in oil.

The water-soluble, thiocyanate ion yielding, compound is employed in amounts sufficient to enable detection of the thiocyanate ion at the recovery point. It can be employed in amounts generally from about 25 p.p.m. to 200 p.p.m. or the limit of its solubility in the well or formation liquids and preferably from about 100 to 150 p.p.m. to provide water at the output well with a thiocyanate ion content generally greater than 10 p.p.m. (parts per million) preferably greater than 15 p.p.m. to insure detection by visual means and greater than 5 p.p.m. to insure detection by instrument means. The upper limit of the amount of the thiocyanate added to the water is dependent upon the water solubility of the particular thiocyanate yielding compound selected, e.g. 570 lbs. ammonium thiocyanate per barrel of water. Obviously, however, economic factors dictate the use of minimum quantities.

The analysis for the presence of thiocyanate ions in water obtained at a recovery point can be accomplished by adding an acidic solution containing ferric ions e.g. ferric chloride, ferric sulfate and ferric nitrate solutions. If thiocyanate ions are present, indicating flow of water from the origin point, a red colored or tinged solution is produced. If the thiocyanate ions are not present, indicating the flow of water from a source other than the origin point, a yellow-green solution is produced. A colorometric, photoelectric cell can be used to detect colors particularly if the thiocyanate ions are present in the water in an amount less than 10 p.p.m. However, I prefer to employ a quantity of thiocyanate ion yielding compound sufficient to provide water at the recovery point with a thiocyanate ion content of 10 p.p.m. or more to enable detection by visual means.

The following specific example will serve to illustrate the present invention but is not to be considered limiting.

*Example I*

650 barrels of water per day, containing 100 lbs. of ammonium thiocyanate, are charged into an input well to flood an oil-bearing sand formation. 50 cc. samples of water are taken from each of 2 output wells, A and B, located 100 ft. from each other and at a radial distance of 150 ft. from the input well. The samples are labelled $a$ and $b$ to correspond to the output well from which each is taken. 5 cc. of a saturated solution of ferric chloride are added to each of the samples with the following results:

| Sample | Visual Color Detection of Resulting Solution |
|---|---|
| $a$ | Red. |
| $b$ | Yellow-green. |

The above data indicates flow of water in the subterranean sand formation from the input well to output well A but not to output well B.

A wide variety of applications for the method of the present invention will be apparent from the above description such as for instance, tracing the possible contamination of water in water wells and determining the rate of flow of liquid from one well to another.

I claim:
1. A method for tracing the flow of water in subterranean areas including adding a water-soluble thiocyanate ion yielding compound to the water at an origin point, recovering a portion of water at a recovery point, and analyzing the portion for thiocyanate ion content as an indication of water derivation from the origin point.
2. The method of claim 1 wherein the analyzing is conducted by adding an acidic solution containing ferric ions to the portion to produce an identifying color.
3. The method of claim 1 wherein the thiocyanate ion yielding compound is ammonium thiocyanate.
4. A method for tracing the flow of water through a subterranean oil-bearing sand formation from an input well to an output well, the steps comprising adding a water-soluble thiocyanate ion yielding compound to the water at the input well, recovering a portion of water at the output well, and analyzing the portion for thiocyanate ion content as an indication of water derivation from the input well.
5. The method of claim 4 wherein the thiocyanate ion yielding compound is employed in the water at the input well in amounts from about 25 p.p.m. to 200 p.p.m. to provide the water at the output well with a thiocyanate ion content greater than about 5 p.p.m.
6. The method of claim 4 wherein the thiocyanate ion yielding compound is ammonium thiocyanate.
7. The method of claim 5 wherein the thiocyanate ion yielding compound is ammonium thiocyanate.

References Cited in the file of this patent

UNITED STATES PATENTS

| 2,553,900 | Doan | May 22, 1951 |
| 2,868,625 | Frank | Jan. 13, 1959 |

OTHER REFERENCES

Kartser: Geochem. Methods of Prospecting and Exploration for Petrol. and Natural Gas, p. 253, English transl. by Witherspoon et al., Univ. of Calif. Press, 1959, pub. in Moscow, 1954.

Horner: Oil Weekly, 1935, July 1, pp. 29, 30 and 71.

Snell: Col. Meth. of Anal., 3rd ed., 1949, p. 783.